Sept. 9, 1958   M. B. RASMUSSON   2,851,198
CONFECTION MIX DISPENSER
Filed Sept. 11, 1956   4 Sheets-Sheet 1
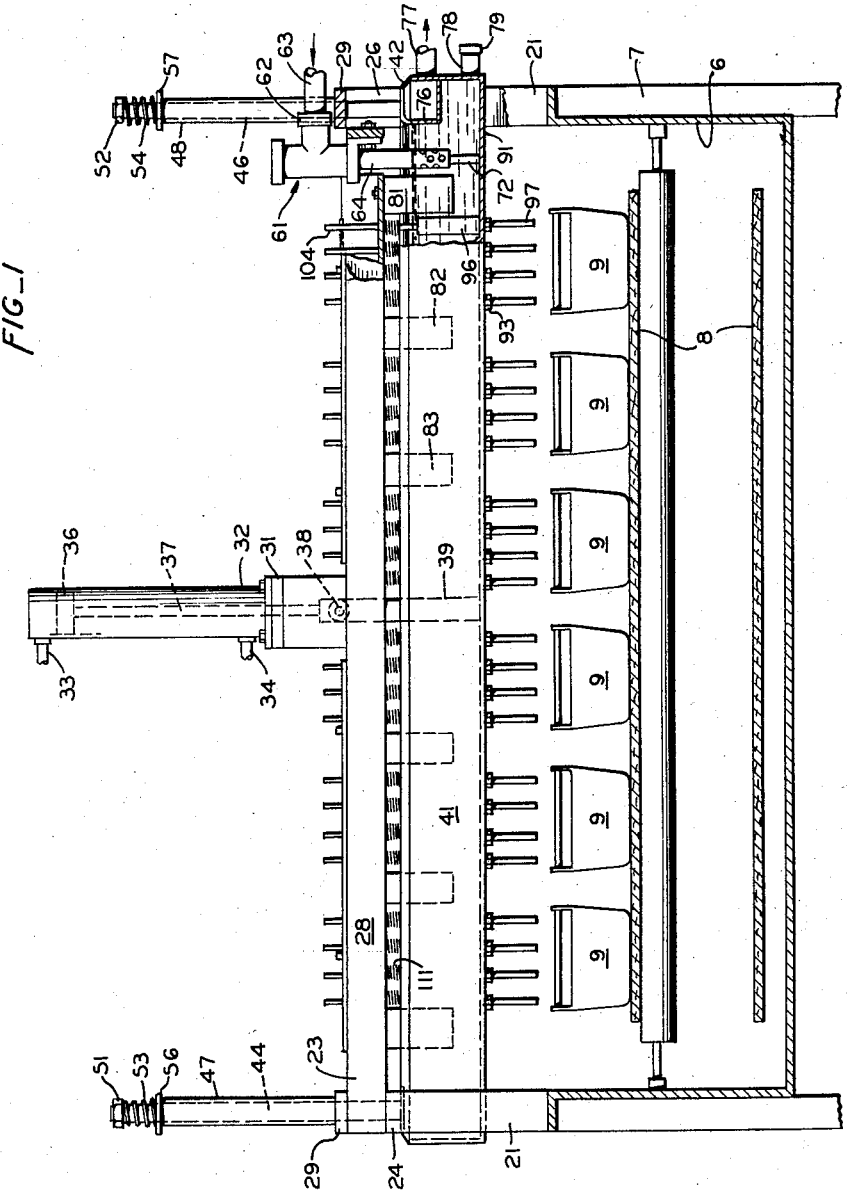
INVENTOR.
MARLIN B. RASMUSSON
BY Lothrop & West
ATTORNEYS Sept. 9, 1958  M. B. RASMUSSON  2,851,198
CONFECTION MIX DISPENSER
Filed Sept. 11, 1956  4 Sheets-Sheet 2
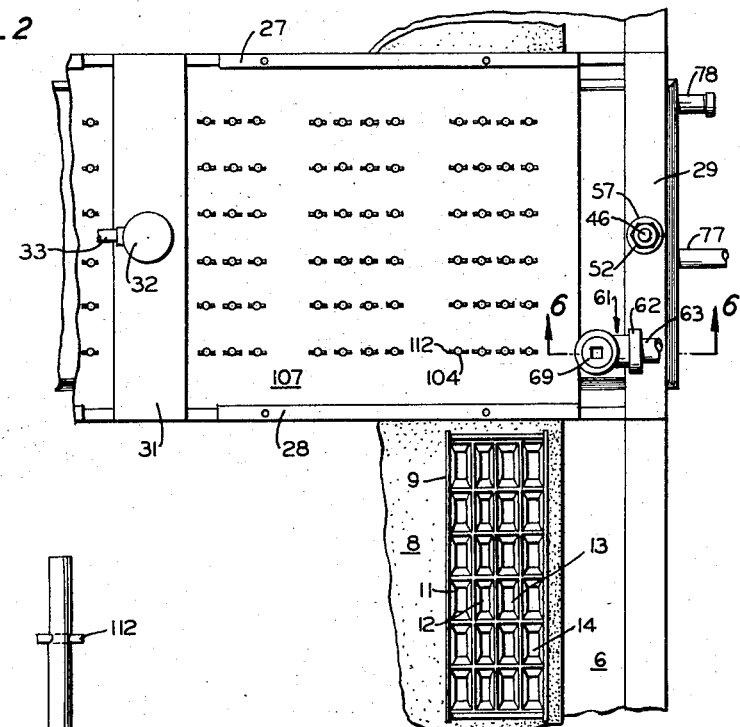
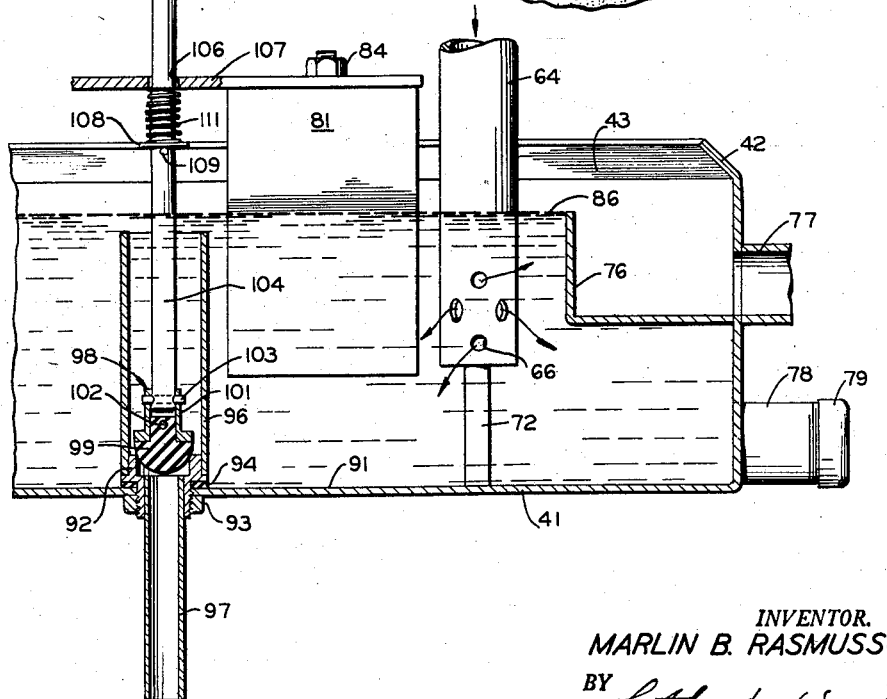
INVENTOR.
MARLIN B. RASMUSSON
BY
ATTORNEYS

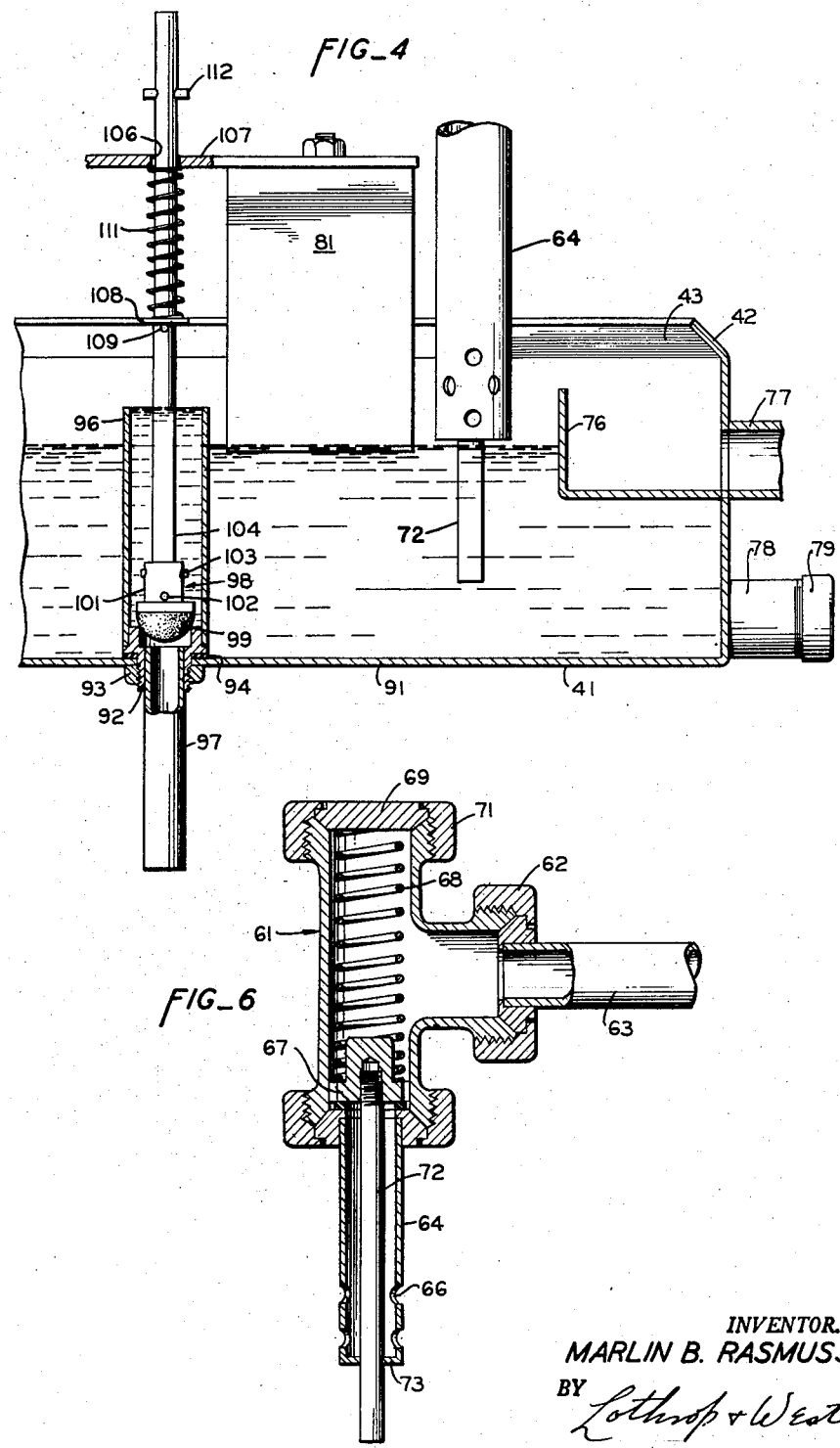

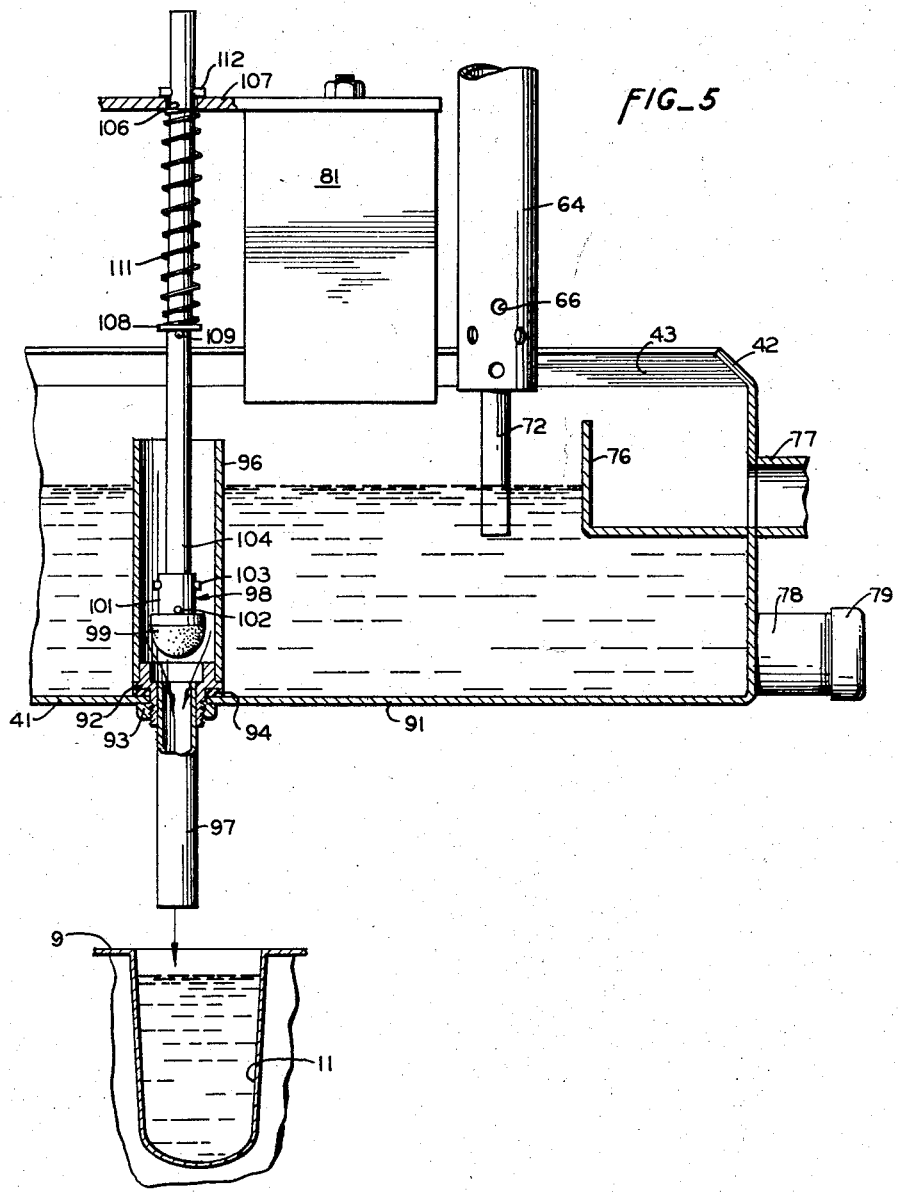

United States Patent Office 2,851,198
Patented Sept. 9, 1958

2,851,198

CONFECTION MIX DISPENSER

Marlin B. Rasmusson, Sacramento, Calif.

Application September 11, 1956, Serial No. 609,139

5 Claims. (Cl. 222—162)

My invention relates to means for dispensing selected or regulated amounts of mix such as liquid water ice mix or liquid ice cream mix for subsequent freezing in confections, especially stick confections. The apparatus herein is especially related to that shown in my co-pending applications entitled Stick Holder filed September 21, 1956 with Serial Number 611,164 and Automatic Stick-Confection Mechanism Serial Number 541,012 filed October 17, 1955.

In the manufacture of confections, for example, water ice confections, for many reasons it is desirable to manufacture upon occasion confections having a precisely regulated amount of mix. This is either for establishing at a selected value the total amount of mix in the confection or for the purpose of providing discreet quantities of several mixes of different colors or different flavors in a single confection. In the mass manufacture of stick confections it is desirable to be able to meter or dispense liquid mix to a number of different molds simultaneously but with substantially the same amount of mix in each mold. The amount selected can be either enough to fill the mold completely or merely enough to fill the mold part of the way with subsequent dispensers being utilized to fill the mold the remainder of the way or a set fraction of the remaining way.

It is therefore an object of my invention to provide a dispenser for dispensing confection mix.

Another object of the invention is to provide a confection mix dispenser capable of metering out selected quantities of mix to a plurality of mold cavities simultaneously.

Another object of the invention is to provide a confection mix dispenser which can be applied to existing machinery of the sort shown in the mentioned applications.

Another object of the invention is to provide a confection mix dispenser all the parts of which are readily accessible for sanitary cleaning.

Another object of the invention is to provide a confection mix dispenser effective simultaneously to charge a relatively large number of mold cavities.

A still further object of the invention is to provide an improved confection mix dispenser.

Other objects together with the foregoing are attained in the embodiment of the invention described in the accompanying description and illustrated in the accompanying drawings in which:

Figure 1 is a cross-section through part of a machine including a confection mix dispenser of my invention, a part of the dispenser itself being shown in side elevation and parts of the machine being shown diagrammatically.

Figure 2 is a fragmentary plan of the structure shown in Figure 1.

Figure 3 is a cross-section to an enlarged scale on a vertical transverse plane through part of the confection mix dispenser of the invention with the tank in filling position.

Figure 4 is a view comparable to Figure 3 and showing the parts with the tank in metering position.

Figure 5 is a view comparable to Figures 3 and 4 and showing the parts in dispensing position.

Figure 6 is a detailed cross-section the plane of section being indicated by the line 6—6 of Figure 2.

While the confection mix dispenser of my invention can be embodied in a number of different ways, it is disclosed herein and described for convenience as it is utilized in connection with a confection making device of the sort shown in my above-identified co-pending application entitled Automatic Stick-Confection Mechanism.

In the confection making device, there is provided a brine tank 6 mounted on a supporting frame 7 and including a conveyor 8 for advancing a plurality of confection molds 9 simultaneously through the tank. The molds 9 are any suitable, standard sort and, as especially shown in Figure 2, are usually elongated in plan and contain four mold cavities 11, 12, 13 and 14 transversely and six such cavities longitudinally making a total of twenty-four cavities longitudinally making a total of twenty-four so that the conveyor 8 carries six molds side by side for simultaneous advancement longitudinally through the tank.

In order that the mold cavities may be filled while the molds are in the brine tank, either before or after the stick holders usually utilized are positioned therein, I preferably provide in accordance with the present invention a frame 21 in the nature of a superstructure transversely spanning the brine tank and suitably supported on and at least temporarily fastened to the frame 7. The superstructure frame 21 includes a composite cross bar 23 at its opposite ends supported on uprights 24 and 26 so that the cross bar 23 extends entirely across the width of the brine tank 6. The cross bar is preferably made up to include transverse beams 27 and 28 at their ends spanned by straps 29 and adjacent the center portion spanned by a plate 31.

Vertically supported on the plate 31 is a pneumatic cylinder 32 having connections 33 and 34 to a suitable pneumatic valving device (not shown). Within the cylinder a piston 36 is reciprocable under the influence of the differential air pressure within the lines 33 and 34. The piston 36 is joined through a connecting rod 37 and a movable pin 38 to a bail 39 joined to a liquid containing tank 41. This is a generally elongated member of sheet metal rectangular in its cross sections except for some inturned flanges 42 which extend around the upper margins of the tank and define the edge of the top opening 43 thereof. The tank is centrally supported on the bail 39 and as the piston 36 moves vertically in the cylinder 32, the tank similarly is vertically reciprocated between an up position and a down position.

In order to guide and stabilize the tank at its ends and also in order to cushion its approach to its down position, the flange 42 is extended somewhat at the ends of the tank to support guide rods 44 and 46 vertically movable within tubes 47 and 48 upstanding from the end straps 29. At the upper ends the rods 44 and 46 are threaded to receive adjustable nuts 51 and 52 overlying springs 53 and 54 resting on washers 56 and 57 at the upper ends of the tubes 44 and 46. While the springs 53 and 54 have little effect in the uppermost position of the mechanism, they serve as cushioning and supporting devices especially adjacent the down position of the tank and can be regulated so as to provide the desired amount of resistance and to support the desired proportion of the weight of the structure.

The tank is provided with means for supplying a confection mix such as water ice mix or ice cream mix. As especially shown in Figures 1 and 6 there is mounted on the frame 26 a valve housing 61 having a disconnect coupling 62 joining it to a mix supply pipe 63. Preferably the pipe 63 is of material in the nature of stainless steel and virtually all of the mechanism in contact with the mix is of a comparable inert and hygienic material. The housing 61 is provided with a nozzle extension 64 communicating freely with the interior of the housing and having outlet apertures 66 in its lower end. This is disposed well within the tank 41 when the tank is in its uppermost position. Situated within the housing 61 is a poppet valve 67 normally urged closed by a spring 68 seated against the valve and also against a removable cap 69 held in the upper part of the casing 61 by a closure ring 71.

A stem 72 secured to the valve poppet 67 depends through the outlet tube 64 and through the inturned bottom 73 thereof which serves as a guide. The stem projects downwardly a substantial distance, as shown in Figure 6, toward the bottom of the tank 41. The length of the valve stem 72 is such that the poppet 67 is unseated when the tank 41 is in its uppermost position and when it is within a zone near the uppermost position. The tank bottom leaves the stem 72 and permits the spring 68 to close the valve as the tank descends from its uppermost position or from a zone near its uppermost position. In this way, confection mix coming through the tube 63 under some pressure is permitted to flow through the outlet nozzle 64 into the tank 41 whenever the valve is open and that occurs in or near the upper position of the tank.

In order to maintain a predetermined or preselected level of confection mix within the tank 41 and to do so in a reasonably accurate manner, the tank is provided with an overflow weir 76 disposed adjacent one end of the tank and affording communication into an overflow tube 77. The tube 77 is preferably flexible and leads to a return point for the mix. Thus, whenever the tank is in or near its uppermost position and the valve 67 is open, mix flows into the tank and overflows the weir 76 at the established level thereof, the excess flowing out through the overflow tube 77 for recirculation. The mix within the tank thus does not at any time become stratified or segregated but since it is continually flowing is maintained homogeneous in nature. Preferably a drain tube 78 is provided at the lowermost point of the tank and is normally closed by a plug 79. This can be periodically removed for final drainage and for flushing.

Means are provided for varying the effective volume of the tank 41 in accordance with the position of the tank. For that reason, there are secured to the cross bar 23 at convenient locations transversely of the framework a plurality of displacement members 81, 82 and 83 symmetrically duplicated on the opposite side of the center line of the tank. The displacement members are each hollow, preferably closed bodies depending from top supports 84 into the tank 41. Each extends substantially into the confection mix in the tank and substantially below the predetermined level 86 thereof as established by the weir 76 when the tank is in its uppermost position. The displacement members 81, 82 and 83 remain stationary on the frame 21 while the tank moves relative thereto in a vertical direction.

In order to measure individual quantities of confection mix for the individual mold cavities, the bottom plate 91 of the tank 41 is provided at regular intervals in vertical registry with the various subjacent mold cavities, with a plurality of openings into each of which a bushing 92 is removably fitted and clamped by a nut 93, there being a flexible gasket 94 between the bushing and the bottom plate 91 to preserve liquid tightness. The bushing is preferably integral with an upstanding charge tube 96 extending vertically from the bottom 91 of the tank 41 to a level somewhat below the predetermined level 86 and thus slightly below the level of the weir 76. The tube 96 is open at its top. The bushing 92 at the bottom is provided with an internally mounted tubular extension 97 leading downwardly to a position slightly above the subjacent one of the mold cavities.

Normally flow from the charge tube 96 into the extension 97 is blocked by a normally closed valve 98. This valve includes a removable closure plug 99 fitted into a collar 101 and secured therein by a removable pin 102. The collar itself is fastened by a removable pin 103 to the lower end of a valve stem 104 extending vertically upwardly and through a corresponding opening 106. This is formed in a plate 107 included in the structure of the cross bar 23 spanning the side rails 27 and 28 and extending virtually for the full width of the tank 6. Interposed between the plate 107 and a washer 108 held on the valve stem 104 by a cross pin 109 is a coil spring 111 the effect of which is to urge the valve 99 closed. The stem 104 extends upwardly substantially above the plate 107 and at an appropriate location carries a cross pin 112 of sufficient length to overlie the opening 106 and to engage the plate 107 under certain circumstances. The pins 112 can be replaced by a continuous wire or wires threaded through adjacent ones of the stems 104.

In the operation of the structure, the conveyor 8 in the brine tank 6 advances step by step. At one point in the advancement all six of the transverse series of molds 9 are disposed beneath the cross bar 23 and with the various mold cavities such as 11, 12, 13 and 14 immediately beneath and in registry with the sundry depending discharge extensions 97. The molds 9 are held stationary in that location for a short interval. During the first part of this time, the tank 41 is in its uppermost position under the influence of the cylinder 32. The bottom of the tank previously has contacted the valve stem 72 and has opened the valve 67. Water ice mix or other confection mix has entered through the conduit 63 so that the tank 41 is filled to the height permitted by the overflow 76, the excess escaping through the recirculating drain 77 as described. Also, at this time the various displacement members 81, 82 and 83 and their symmetrical duplicates are disposed well into the liquid retained in the tank. The liquid is substantially above the open upper ends of all of the various charge tubes 96 and since the springs 111 keep all of the valves 99 closed, the various charge tubes are all filled.

The cylinder 32 is then actuated to permit the piston 36 to lower. The tank 41 correspondingly lowers and as it does so disengages the stem 72 so that the spring 68 closes the valve 67 and further influx of confection mix is halted. Also as the tank 41 lowers, the displacement members 81, 82 and 83 and their symmetrical counterparts are held behind. Since they are in effect withdrawn from the liquid, the liquid level drops considerably below the level of the weir 76 and considerably below the level of the open upper ends of the charge tubes 96, as shown clearly in Figure 4. Thus, each of the charge tubes 96 retains a predetermined quantity of fluid.

As the piston 36 continues to descend, the discharge extensions 97 approach closer and closer to the subjacent mold cavities. Just before the tank 41 reaches its lowermost position, the various pins 112 come into abutment with the plate 107 and hold back the valve stems 104. The final downward movement of the tank 41 then pulls the valve seats 92 downwardly away from the valves and permits the measured quantity of material within the charge tubes 96 to discharge through the outlet extensions 97 into the mold cavity in the mold 9 below. After a suitable interval has elapsed for gravitational discharge of the accurately measured charge of liquid into the molds, the cylinder mechanism 32 is oppositely actuated and the piston 36 rises and lifts the tank 41 with it. As the tank lifts the valve seats 92 again encounter the valves 99 and lift them and the stems 104 so that the pins 112 are lifted toward their initial positions and so that the springs 111 are again compressed.

The liquid remaining in the tank 41 encounters the displacement devices 81, 82 and 83 and their counterparts and the liquid level is displaced upwardly. Toward the final upward movement of the tank 41, the tank bottom engages the stem 72 of the valve 67 and again opens the valve so that there is a repeated influx of confection mix. The tank 41 is thus again charged and returned to its initial condition. In the interim, the transverse row of molds 9 is advanced another step by the conveyor 8 and a succeeding transverse row of molds is positioned in proper subjacent registry with the discharge extensions 97 for a repetition of the cycle.

While each of the mold cavities can be entirely filled in one operation, if the charge tubes 96 are of sufficient size to segregate the requisite amount of confection mix, it is usually preferred to have a plurality of units comprising the crossbar 23 and associated structure shown in Figure 1 arranged at subsequent stations along the length of the tank 6. Under these circumstances, one form of mix; that is, one color or one flavor is put into the bottom third, for example, of the subjacent cavities, the charge tubes 96 being properly calibrated for the requisite volume. As the partly filled molds advance toward the next confection mix dispenser, the charge in the lower third of the mold is partly or entirely frozen. Then, at the next station a comparable dispenser releases confection mix of a different color or flavor or both into the middle third of the cavity. As the mold leaves the second station and proceeds further through the brine tank, further freezing occurs. Finally, the molds are positioned under a third confection mix dispenser. At this station the final third of confection mix preferably of a different color or flavor or both is introduced into the upper third of the mold cavity. Then the confection is finally frozen. The resulting confection is a frozen block on a stick, the block consisting of definite strata of confection material of different colors or different flavors or both.

What is claimed is:

1. A confection mix dispenser comprising a frame having a cross bar, a tank mounted on said frame for vertical reciprocation, means for reciprocating said tank between upper and lower positions, an overflow weir in said tank, means for supplying said tank with confection mix, displacement members on said cross bar and depending into confection mix in said tank in only the uppermost reciprocated positions of said tank, charge tubes in said tank and extending upwardly from the bottom thereof to a level below said weir, valves in the bottom of said tubes, and means engaging said cross bar and said valves for opening said valves in only the lowermost reciprocated positions of said tank.

2. A confection mix dispenser comprising a frame, a tank, means for reciprocating said tank between upper and lower positions relative to said frame, an overflow weir in said tank, means for supplying said tank with confection mix, displacement members on said frame and extending into confection mix in said tank in only the uppermost reciprocated positions of said tank, charge tubes in said tank and extending upwardly from the bottom thereof to a level below said weir, valves in said tubes, and means for opening said valves in only the lowermost positions of said tank.

3. A confection mix dispenser comprising a frame, a tank, means for moving said tank relative to said frame between an upper position and a lower position, means for supplying said tank with confection mix and means for limiting the level thereof to a predetermined level in said tank, means engaging said tank and actuated by movement of said tank out of said upper position for shutting off said supplying means, means for displacing some of said mix in said tank when said tank is in said upper position, upstanding charge tubes within said tank having upper open ends terminating below said predetermined level, valves in said charge tubes, and means for opening said valves when said tank is moved to said lower position.

4. A confection mix dispenser comprising a tank, means for supplying said tank with confection mix and limiting the level thereof to a predetermined level in said tank, means engaging said tank and actuated by movement of said tank out of said upper position for shutting off said supplying means, a displacement member, means holding said displacement member in position to extend into the mix in said tank after said supplying means is shut off, a charge tube in said tank and having an open upper end terminating below said predetermined level, and means effective when said tank is lowered sufficiently to remove said displacement member out of said mix for releasing confection mix from said charge tube.

5. A confection mix dispenser comprising a frame, a cross bar on said frame, a tank mounted on said frame for vertical reciprocation, means for reciprocating said tank between an upper position and a lower position, displacement members on said cross bar depending into said tank when said tank is in said upper position, means for supplying said tank with confection mix, a normally closed supply valve in said supplying means, means operated by said tank for opening said supply valve when said tank is in said upper position, an overflow weir in said tank for establishing a level of confection mix therein, a charge tube open at the top and extending upwardly into said tank from the bottom thereof to a point below said level, a normally closed release valve in the bottom of said charge tube, and a stem on said release valve engaging said cross bar for holding said release valve open when said tank is in said lower position.

References Cited in the file of this patent

UNITED STATES PATENTS

| | | |
|---|---|---|
| 731,526 | Troupe | June 23, 1903 |
| 775,307 | Ortmann et al. | Nov. 22, 1904 |
| 1,360,023 | Risser | Nov. 23, 1920 |
| 1,442,138 | Falkiner | Jan. 16, 1923 |
| 1,743,304 | Angell | Jan. 14, 1930 |